US012646354B2

(12) United States Patent
Perruchoud

(10) Patent No.: US 12,646,354 B2
(45) Date of Patent: Jun. 2, 2026

(54) 3D FACE RECOGNITION SYSTEM

(71) Applicant: ams-OSRAM Asia Pacific Pte. Ltd., Singapore (SG)

(72) Inventor: Loic Perruchoud, Réchy (CH)

(73) Assignee: ams-OSRAM Asia Pacific Pte. Ltd., Singapore (SG)

( * ) Notice: Subject to any disclaimer, the term of this patent is extended or adjusted under 35 U.S.C. 154(b) by 321 days.

(21) Appl. No.: 18/578,927

(22) PCT Filed: Jun. 28, 2022

(86) PCT No.: PCT/SG2022/050446
§ 371 (c)(1),
(2) Date: Jan. 12, 2024

(87) PCT Pub. No.: WO2023/287351
PCT Pub. Date: Jan. 19, 2023

(65) Prior Publication Data
US 2025/0005960 A1 Jan. 2, 2025

(30) Foreign Application Priority Data

Jul. 14, 2021 (GB) ...................................... 2110154

(51) Int. Cl.
*G06V 40/16* (2022.01)
*G06V 10/52* (2022.01)
(52) U.S. Cl.
CPC ............ *G06V 40/168* (2022.01); *G06V 10/52* (2022.01); *G06V 40/166* (2022.01); *G06V 40/172* (2022.01)

(58) Field of Classification Search
None
See application file for complete search history.

(56) References Cited

U.S. PATENT DOCUMENTS

| | | | |
|---|---|---|---|
| 2011/0150300 A1* | 6/2011 | Lee ...................... | G06V 40/166 382/118 |
| 2018/0189550 A1 | 7/2018 | McCombe et al. | |
| 2019/0156100 A1 | 5/2019 | Rougeaux et al. | |
| 2019/0212125 A1 | 7/2019 | Deleule et al. | |

(Continued)

FOREIGN PATENT DOCUMENTS

| | | |
|---|---|---|
| CN | 110032911 A | 7/2019 |
| TW | 201123034 A | 7/2011 |

OTHER PUBLICATIONS

Search Report of corresponding British patent application No. 2110154.8, dated Dec. 9, 2021, 2 pages (for informational purposes only).

(Continued)

*Primary Examiner* — Leon Flores
(74) *Attorney, Agent, or Firm* — Viering, Jentschura & Partner mbB

(57) ABSTRACT

A three-dimensional (3D) face recognition system includes a structured light sensor or stereo camera sensor. The 3D face recognition system also includes a time-of-flight sensor. The 3D face recognition system further includes a processor. The processor is configured to run algorithms for face recognition on data from the structured light sensor or stereo camera sensor. The processor is also configured to use distance data from the time-of-flight sensor to optimise the algorithms for face recognition.

20 Claims, 4 Drawing Sheets

(56) References Cited

U.S. PATENT DOCUMENTS

| | | |
|---|---|---|
| 2019/0213309 A1 | 7/2019 | Morestin et al. |
| 2019/0213348 A1 | 7/2019 | Yang et al. |

OTHER PUBLICATIONS

Zhao, Jeffrey et al., "Hybridization of structured light and Time-of-Flight sensing using maximum a posteriori Markov Random Fields", 2019 IEEE 9th International Conference on Consumer Electronics (ICCE-Berlin), IEEE, Berlin, 2019, pp. 82-87.
International Search Report issued on Feb. 20, 2023, for corresponding International Patent Application No. PCT/SG2022/050446 (3 pages).
Written Opinion issued on Feb. 20, 2023, for corresponding International Patent Application No. PCT/EP2022/050446 (4 pages).

* cited by examiner

400

3D FACE RECOGNITION SYSTEM

CROSS REFERENCE TO RELATED APPLICATION

This is a national stage application of international application PCT/SG2022/050446, filed on Jun. 28, 2022, which claims priority to British application 2110154.8, filed on Jul. 14, 2021, the entire contents of each of which are incorporated herein by reference.

FIELD OF INVENTION

The present disclosure is in the field of face recognition systems and, in particular, 3-dimensional (3D) face recognition systems for use in devices such as electronic locks (e-locks) and smartphones.

BACKGROUND OF THE DISCLOSURE

Many known electronic devices such as smartphones and tablet devices may employ biometric feature recognition technologies for a variety of reasons, such as unlocking the device, providing access to a resource through identification verification, or other authentication purposes.

One particular type of biometric feature recognition is face recognition. In an example of face recognition, a device may be configured to identify a user based on matching one or more features identified in an image of the user's face against features in a database of faces.

Face recognition technologies may require processing of complex and computationally-intensive algorithms to correctly and reliably recognise a face. However, some electronic devices may have stringent power requirements, and therefore may be less suited to face recognition technologies that may incur substantial power consumption. For example, it is undesirable for face recognition technologies on portable battery-operated devices such as smartphones to consume significant power, thereby reducing battery life. In another example, a battery-operated e-lock may employ face recognition to control access to a secure area. Such an e-lock may be required to operate for a period of a year or more without requiring a change of batteries, and therefore may not be suited to running algorithms that may require a relatively high power consumption.

Furthermore, devices such as smartphones may require any such face recognition to be performed relatively quickly. For example, unlocking a smartphone using face recognition must be performed sufficiently quickly to avoid inconvenience or nuisance to a user. However, implementation of computationally intensive face recognition algorithms may require designers of such devices to make undesirable compromises on security to avoid excessive power consumption and unduly lengthy algorithm execution times.

It is therefore desirable to implement a face recognition solution that correctly and reliably recognises a face without incurring excessive power consumption or requiring relatively long execution times.

It is therefore an aim of at least one embodiment of at least one aspect of the present disclosure to obviate or at least mitigate at least one of the above identified shortcomings of the prior art.

SUMMARY

The present disclosure relates to three-dimensional (3D) face recognition systems for use in devices such as e-locks and smartphones. According to a first aspect of the disclosure, there is provided a 3D face recognition system comprising a structured light sensor or stereo camera sensor. The system comprises a time-of-flight sensor. The system comprises a processor configured to run algorithms for face recognition on data from the structured light sensor or stereo camera sensor, wherein the processor is configured to use distance data from the time-of-flight sensor to optimise the algorithms for face recognition.

Advantageously, the distance data may be used to limit and/or select particular data to be processed by the algorithms for face recognition. In doing so, an amount of data to be processed by the algorithms for face recognition may be reduced, thereby potentially decreasing an overall power consumption of the algorithms and/or decreasing an execution time of the algorithms, as described in more detail below.

The term structured light sensor will be understood to refer to a sensor that comprises means such as a projector to project a known pattern onto a target and further image-capturing means such as a camera to capture an image of the pattern as projected onto the target.

It will be understood that references herein to a 'structured light sensor' may refer to a sensor provided as one or more discrete sensors, or a system comprising multiple components, such as a projector, a camera, and processing means. In some examples, the data from the structured light sensor may correspond to an image as captured by the image-capturing means. In some examples, the structured light sensor may comprise processing means configured to inspect distortion in the projected pattern on the target, e.g. a disparity from a reference pattern. In such examples, data from the structured light sensor may correspond to the disparity from the reference pattern.

The term stereo camera sensor will be understood to refer to a sensor that comprises two cameras, wherein a disparity between images captured by each camera may be calculated by processing images from each camera, for example using rectification and matching algorithms, and extracting any correspondences. In some examples, data from the stereo camera sensor may correspond to images as captured by each camera of the sensor. In some examples, the stereo camera sensor may comprise processing means configured to determine such disparities. In such examples, data from the stereo camera sensor may correspond to the disparities.

The processor may comprise one or more microprocessors and/or microcontrollers. The processor may comprise a distributed or remote processing means, e.g. a cloud based processing capabilities. For example, in embodiments data from the structured light sensor or stereo camera sensor, and distance data from the time-of-flight sensor, may be transmitted to remote processing means, wherein algorithms for face recognition may be executed by the remote processing means. An output, e.g. an indication of recognition of a face, may in some examples be transmitted from the remote processing means to the device comprising the structured light sensor or stereo camera sensor, e.g. a smartphone. In some examples, an output, e.g. an indication of recognition of a face, may enable access to a resource, such as a software resource or feature which may be installed on the remote processing means, on another remote processing means, and/or on the device comprising the structured light sensor or stereo camera sensor.

The algorithms for face recognition may comprise a face detection algorithm for applying face detection on a plurality of scales.

The plurality of scales may refer to a plurality of sizes, e.g. dimensions. That is, the face recognition may be required to operate when a face is at a range of distances from the structured light sensor or stereo camera sensor. In instances when a target face is relatively close to the structured light sensor or stereo camera sensor, an image of the face as seen by the sensor may be relatively large, e.g. be of a large scale. In instances when a target face is relatively far from the structured light sensor or stereo camera sensor, an image of the face as seen by the sensor may be relatively small, e.g. be of a small scale.

The processor may be configured to optimise the algorithms for face recognition by using the distance data to reduce a number of scales to be explored by the face detection algorithm.

Advantageously, reducing the number of scales to be explored by the face detection algorithm may reduce an overall amount of data to be processed, thereby potentially reducing a total power consumption and/or execution time of the face detection algorithm.

Using the distance data to reduce a number of scales to be explored by the face detection algorithm may comprise correlating the distance data with one or more scales of the plurality of scales.

For example, if the distance data indicates that a target face is a relatively short distance from the structured light sensor or stereo camera sensor, only one or more scales corresponding to such a short distance, e.g. one or more scales corresponding to a relatively large image of the target face, may be used by the face detection algorithm to detect a presence of a face.

The algorithms for face recognition may comprise a depth map reconstruction algorithm.

The depth map reconstruction algorithm may be configured to generate a depth map based on data from the structured light sensor or stereo camera sensor.

In the example of a stereo camera sensor, generation of the depth map may comprise searching and/or mapping disparities between images captured of a target face by each of a two cameras in the stereo camera sensor.

In the example of a structured light sensor, generation of the depth map may comprise searching and/or mapping disparities between an image of a pattern projected on a target face and a reference pattern.

The processor may be configured to optimise the face recognition algorithm by using the distance data to reduce a disparity search range of the depth map reconstruction algorithm.

Advantageously, by reducing a disparity search range, an overall amount of data to be processed may be reduced accordingly, thereby potentially reducing a total power consumption and/or execution time of the depth map reconstruction algorithm. For example, if the distance data indicates that a target face is a relatively short distance from the structured light sensor or stereo camera sensor, then the disparity search range may be relatively large. However, if the distance data indicates that a target face is a relatively long distance from the structured light sensor or stereo camera sensor, then the disparity search range may be relatively small.

The algorithms for face recognition may comprise a face biometrics algorithm for extracting biometric features from an output of the depth map reconstruction algorithm.

For example, the face biometrics algorithm may extract biometric features such as: features of the face, dimensions of the face, relative distance between features of the face, shapes and/or orientations of one or more feature of the face.

The face biometrics algorithm may compare the biometric features with at least one model of a face.

The at least one model of a face may be stored on a database. The database may be stored on a device implementing the 3D face recognition system. The database may be stored on a remote device, e.g. a server or cloud based service. The model may comprise information corresponding to one or more biometric features of a plurality of models of faces.

The processor may be configured to make a decision on whether a face is recognised based on the comparison of the biometric features with the at least one model of a face.

In instances when the processor determines that it is unable to make a decision on whether a face is recognised and/or determines that a face is not recognised, the processors may be configured to use further distance data from the time-of-flight sensors and further data from the structured light sensor or stereo camera sensor to run the algorithms for face recognition. That is, the processor may make a further attempt at face recognition by configuring the sensors to capture further data, and processing said further data. Advantageously, if distance data is used to select a range of scales and/or disparity range that does not accurately correspond to data from the structured light sensor or stereo camera, for example due to relative movement of a face, then one or more further attempts at face recognition using further data may be attempted.

The time-of-flight sensor may be configured to provide data corresponding to a distance to a target face.

The structured light sensor or stereo camera sensor may be configured to provide data corresponding to a depth map of the target face.

The time-of-flight sensor may be a one-dimensional (1D) time-of-flight sensor.

That is, unlike other time-of-flight sensors such as 3D time-of-flight sensors that may provide depth map information and/or information relating to a three-dimensional scene, a 1D time-of-flight sensor simply provides data corresponding to a distance to a target, e.g. a distance to a one-dimensional point on a target. Advantageously, such 1D time-of-flight sensors are relatively cheap and low-power.

The structured light sensor or stereo camera sensor may be configured to provide data corresponding to a plurality of frames. The time-of-flight sensor may be configured to provide distance data corresponding to each frame.

Advantageously, the 3D face recognition system may operate with data corresponding to a single frame and/or video data, e.g. a plurality of frames.

According to a second aspect of the disclosure, there is provided a device comprising a 3D face recognition system according to the first aspect, wherein the device is one of: an electronic lock (eLock); a smartphone; a tablet device; a personal computer; a laptop; a wearable device; a cellular telephone; a camera; a video recording device; a robotic device; a measuring device; a gaming device; or an automotive device.

According to a third aspect of the disclosure, there is provided a method of three-dimensional (3D) face recognition comprising the steps of: configuring a time-of-flight sensor to provide data corresponding to a distance to the target face; configuring a structured light sensor or stereo camera sensor to provide data corresponding to a depth map of a target face; and running algorithms for face recognition on the data from the structured light sensor or stereo camera sensor, using the data from the time-of-flight sensor to optimise the algorithms.

The algorithms for face recognition may comprise a face detection algorithm for applying face detection on a plurality of scales. Optimising the algorithms may comprise using the distance data to reduce a number of scales to be explored by the face detection algorithm.

The algorithms for face recognition may comprise a depth map reconstruction algorithm. Optimising the algorithms may comprise using the distance data to reduce a disparity search range of the depth map reconstruction algorithm.

According to a fourth aspect of the disclosure, there is provided a computer program product comprising instructions which, when the program is executed by a computer, cause the computer to carry out the steps of the method of the third aspect.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF DRAWINGS

These and other aspects of the present invention will now be described, by way of example only, with reference to the accompanying drawings, which are.

DETAILED DESCRIPTION OF DRAWINGS

Figures 1A, 1B:
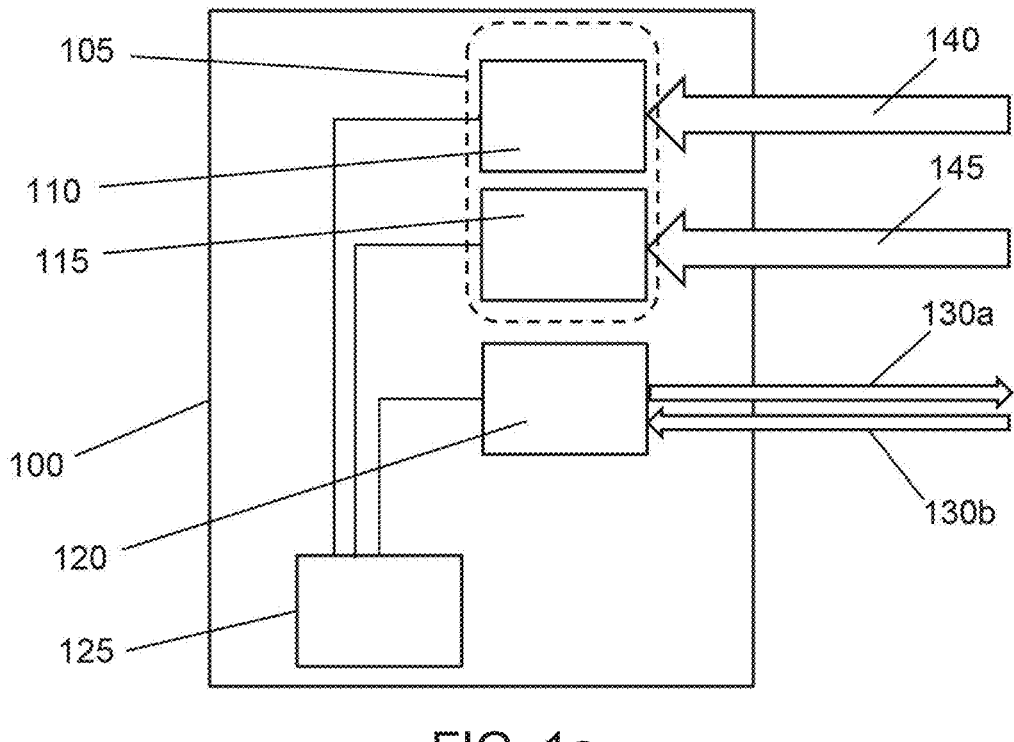
FIG. 1a depicts a three-dimensional (3D) face recognition system according to an embodiment of the disclosure.
FIG. 1b depicts a three-dimensional (3D) face recognition system according to another embodiment of the disclosure.

FIG. 1a depicts a three-dimensional (3D) face recognition system 100 according to an embodiment of the disclosure. The system 100 comprises a stereo camera sensor 105. The stereo camera sensor 105 comprises a first camera 110 and a second camera 115. Each camera 110, 115 is configured to receive radiation 140, 145, e.g. visible and/or infrared light, from a target such as a face. One or more disparities between images captured by the first camera 110 and the second camera 115 may be calculated by processing images from each camera 110, 115, for example using rectification and matching algorithms, and extracting any correspondences.

It will be appreciated that the above-described stereo camera sensor is provided for purposes of example only. In other embodiments falling within the scope of the disclosure, other stereo camera sensors may be used. For example, in some embodiments the stereo camera sensor may also comprise one or two projectors. Such a stereo camera sensor may be used in a system known in the art as an active stereo system. In such a stereo camera sensor, one projector may be configured as a dot projector for creating a pattern to assist and/or enhance operation of the depth map reconstruction algorithm. In such a stereo camera sensor, one projector may be configured as a flood illuminator, thereby create an image with a relatively uniform illumination for face detection and to provide features for the face recognition algorithm.

In the example of FIG. 1a, data from the stereo camera sensor 105 may correspond to such disparities. In other examples, data from the stereo camera sensor 105 may correspond to images as captured by each camera 110, 115 of the stereo camera sensor 105, wherein disparities are calculated by a processor 125.

The system 100 also comprises a time-of-flight sensor 120. The time-of-flight sensor 120 is a 1D time-of-flight sensor, e.g. a sensor configured to provide data corresponding to a distance to a target. That is, the time-of-flight sensor 120 is configured to provide data corresponding to a distance to a one-dimensional point on a target. The time-of-flight sensor 120 is configured to emit radiation 130 towards the target and receive reflected radiation 135 from the target, and determine the distance to the target based on a round-trip duration of the radiation 130, 135 or a phase shift in the reflected radiation 135.

The system 100 also comprises the processor 125. The processor 125 is configured to run algorithms for face recognition on data from the stereo camera sensor 105, wherein the processor 125 is configured to use distance data from the time-of-flight sensor 120 to optimise the algorithms for face recognition. In particular, the distance data from the time-of-flight sensor 120 may be used to limit and/or select particular data to be processed by the processor 125 executing the algorithms for face recognition. In doing so, an amount of data to be processed by the processor 125 executing the algorithms for face recognition may be reduced, thereby potentially decreasing an overall power consumption of the algorithms and/or decreasing an execution time of the algorithms, as described in more detail below.

FIG. 1b depicts a 3D face recognition system 150 according to an embodiment of the disclosure. The system 150 comprises a structured light sensor 155. The structured light sensor 155 comprises a projector 160 to project a known pattern onto a target and a further image-capturing device 165, e.g. a camera, to capture an image of the pattern as projected onto the target. As such, the structured light sensor 155 is configured to provide data corresponding to disparities between the known pattern projected on to the target and the image of the pattern as projected onto the target.

The projector 160 may be configured to project a pattern comprising infrared and/or visible radiation 190 onto the target. The image-capturing device 165 may be configured to sense such infrared and/or visible radiation 195.

The system 150 also comprises a time-of-flight sensor 170. The time-of-flight sensor 170 is a 1D time-of-flight sensor. The time-of-flight sensor 170 is configured to emit radiation 180 towards the target and receive reflected radiation 185 from the target, and determine the distance to the target based on a round-trip duration of the radiation 180, 185 or a phase-shift in the reflected radiation 185.

The system 150 also comprises a processor 175. The processor 175 is configured to run algorithms for face recognition on data from the structured light sensor 155, wherein the processor 175 is configured to use distance data from the time-of-flight sensor 170 to optimise the algorithms for face recognition. In particular, the distance data from the time-of-flight sensor 170 may be used to limit and/or select particular data to be processed by the processor 175 executing the algorithms for face recognition. In doing so, an amount of data to be processed by the processor 175 executing the algorithms for face recognition may be reduced, thereby potentially decreasing an overall power consumption of the algorithms and/or decreasing an execution time of the algorithms, as described in more detail below.

Figure 2:
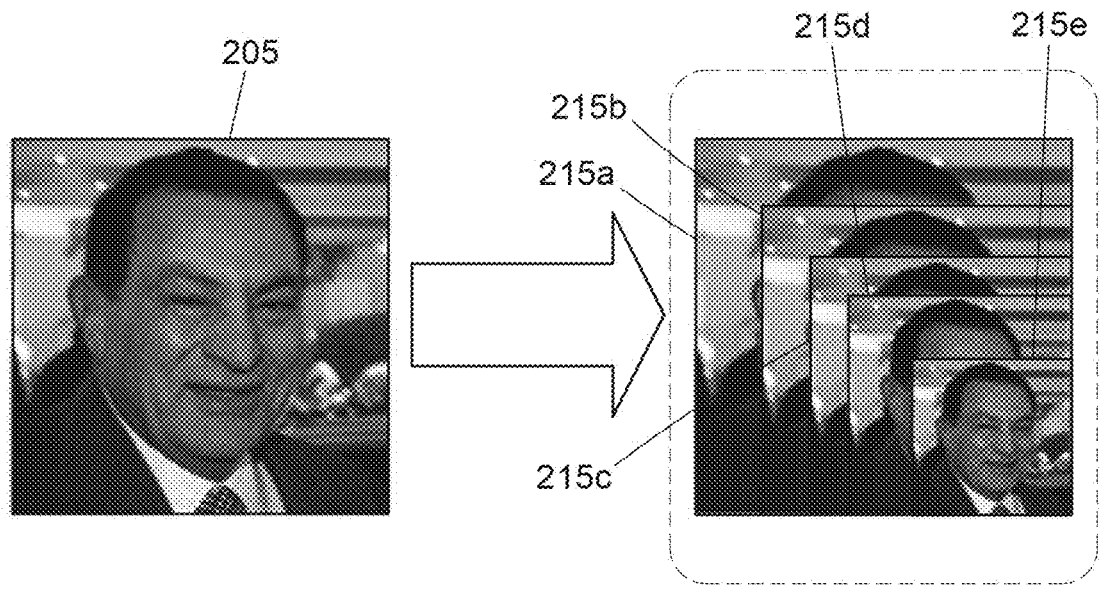
FIG. 2 depicts a representation of a configuration of a face detection algorithm for applying face detection on a plurality of scales, according to an embodiment of the disclosure.

FIG. 2 depicts a representation of a configuration of a face detection algorithm for applying face detection on a plurality of scales, according to an embodiment of the disclosure.

In some embodiments, the face detection algorithm may be trained to detect a face, e.g. image 205. The face detection algorithm may be configured to search for features corresponding to a face. The face detection algorithm may be configured to search for features corresponding to any face, e.g. not necessarily a face of a particular person such as image 205. In the example depicted in FIG. 2, the face detection algorithm is configured to search for features corresponding to a face in the input images captured by the stereo camera sensor 105 or the structured light sensor 155 on a plurality of scales of the input images, as represented by an image pyramid 210.

An output of the face detection algorithm might be an indication that either no face is detected or that one or more faces are detected in areas of the image, as described in more detail below with reference to the flow diagram 400 of FIG. 4.

In some embodiments, in the case that one or more faces are detected, a depth map can be reconstructed where the face is detected and features are extracted from the depth map and from the image of the face to be compared against the features of a reference template.

For illustrative purposes of explaining the concept of a plurality of scales, in the example of FIG. 2, the image pyramid 210 is depicted comprising a plurality of images 215a-215e. Each image 215a-215e corresponds to the image 205 scaled to different dimensions. In the example of FIG. 2, the image pyramid 210 comprises five images 215a-215e, each corresponding to a different scale. It will be appreciated that in embodiments an amount of scales explored by the face detection algorithm may be more than or less than five scales.

In the example of FIG. 2, each image in the image pyramid 210 corresponds to the image 205 as seen at a different distance. For example, if the image 205 was to be viewed from a relatively large distance, then a size of the face in the image 205 would appear relatively small, and may correspond to a size of the face in the image 215e of the image pyramid 210. Conversely, if the image 205 was to be viewed from a relatively small distance, then a size of the face in the image 205 would appear relatively large, and may for example correspond to a size of the face in the image 215a of the image pyramid 210.

In some embodiments, the image pyramid 210 may be generated and stored in a memory. In such embodiments, the image pyramid 210 may be configured as a low-pass image pyramid. In some embodiments, the image pyramid 210 may be configured as a band-pass image pyramid. In some embodiments, the image pyramid 210 may be configured as any of: a Gaussian pyramid; a Laplacian pyramid; or a Steerable pyramid.

In some examples, the image pyramid 210 may be generated by the 3D face recognition system 100, 150. In other embodiments, the image pyramid may be provided to the 3D face recognition system 100, 150. The image pyramid may be maintained in a database accessible by the 3D face recognition system 100, 150.

In an embodiment, algorithms for face recognition that may be executed by the processor 125, 175 may comprise a face detection algorithm for applying face detection on the plurality of scales. In use, an image of a target face may be captured by at least one camera 110, 115 of stereo camera sensor 105 or by the image-capturing device 165 of the structured light sensor 155.

If the target face is relatively close to the stereo camera sensor 105 or structured light sensor 155, then the target face may appear relatively large in the captured image. Thus, the captured image may, for example, correspond to image 215a of the image pyramid 210, e.g. an image having a relatively large face.

If the target face is relatively far from the stereo camera sensor 105 or structured light sensor 155, then the target face may appear relatively small in the captured image. Thus, the captured image may, for example, correspond to image 215e of the image pyramid 210, e.g. an image having a relatively small face.

Prior art face detection algorithms may be configured to compare the captured image to each image 215a-215e of the image pyramid 210 to determine whether a face is detected and/or explore each scale of the image pyramid to determine whether a face is detected. For example, prior art face detection algorithms may attempt to correspond features of the captured image to each of image 215a-215e of the pyramid. The face detection algorithms may be configured to provide an index indicating a degree of certainty of a match between the captured image and each of image 215a-215e of the image pyramid 210.

Such prior art face detection algorithms may be computationally intensive due, at least in part, to a quantity of scale, e.g. images 215a-215e in the image pyramid 210, that are processed to detect a face.

In embodiments of the present disclosure, the processor 125, 175 is configured to optimise the algorithms for face recognition by using distance data from the time-of-flight sensor 120, 170 to reduce a number of scales, e.g. a number of images 215a-215e of the image pyramid 210, to be explored by the face detection algorithm. Advantageously, reducing the number of scales to be explored by the face detection algorithm may reduce an overall amount of data to be processed, thereby potentially reducing a total power consumption and/or execution time of the face detection algorithm.

Using the distance data from the time-of-flight sensor 120, 170 to reduce a number of scales to be explored by the face detection algorithm may comprise correlating the distance data with one or more scales of the plurality of scales. For example, if the distance data indicates that a target face is a relatively short distance from the structured light sensor 155 or stereo camera sensor 105, only one or more images 215a-215e of the image pyramid 210 that correspond to such a short distance may be used by the face detection algorithm to detect a presence of a face. Continuing with the example where based on the distance data the target face is determined to be relatively short distance from the structured light sensor 155 or stereo camera sensor 105, the processor 125, 175 may only use one image, e.g. image 215a, or a subset of the images 215a-215e for the face detection algorithm. Correlation of the distance data from the time-of-flight sensor 120, 170 with one or more scales of the plurality of scales may comprise comparing the distance data 120, 170 with the distance of the face from the image-capturing device when the image was captured.

Figure 3:
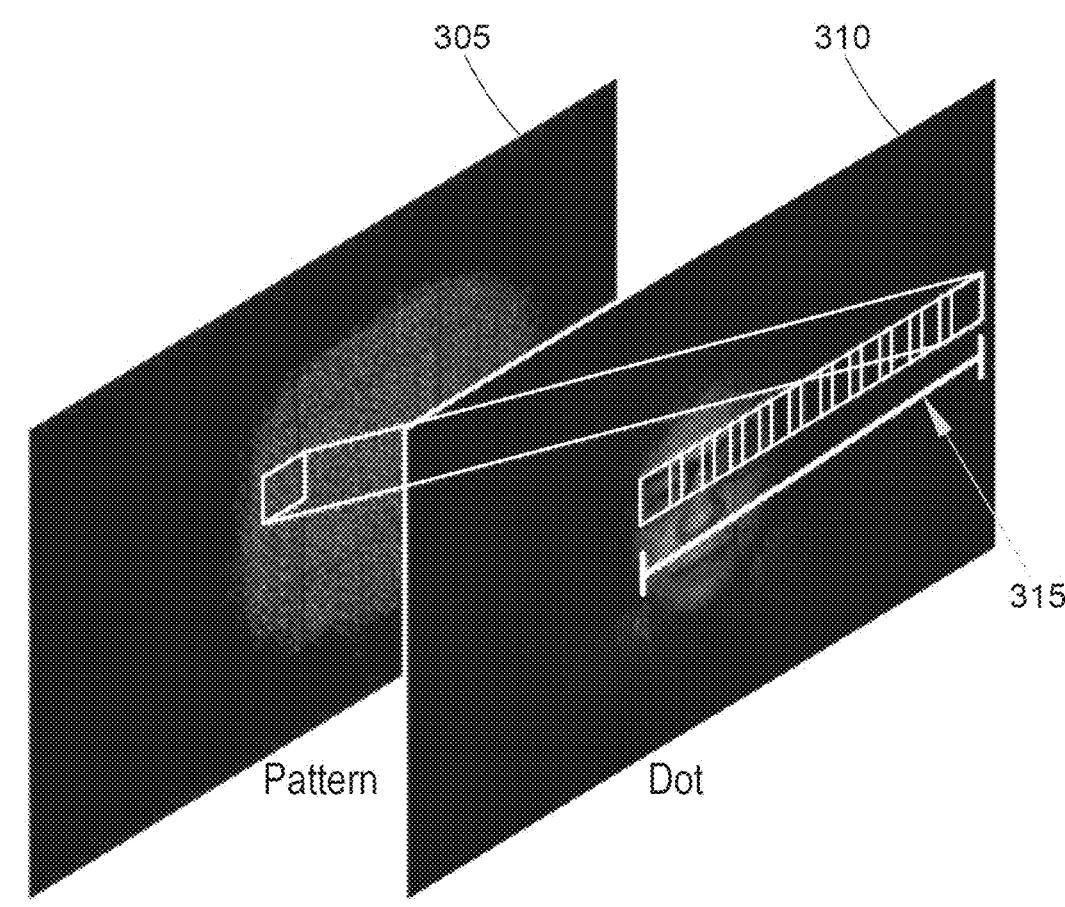
FIG. 3 depicts a representation of a disparity search range of a depth map reconstruction algorithm, according to an embodiment of the disclosure.

In some embodiments, the algorithms for face recognition executed by the processor 125, 175 comprise a depth map reconstruction algorithm. FIG. 3 depicts a representation of a disparity search range of such a depth map reconstruction algorithm, according to an embodiment of the disclosure.

A disparity search comprises searching for disparities between a reference pattern 305 or image, and a captured image 310 as described in more detail below.

The depth map reconstruction algorithm may be configured to generate a depth map based on data from the structured light sensor 155 or stereo camera sensor 105. In the example of a stereo camera sensor 105, generation of the depth map may comprise searching and/or mapping disparities between images captured of a target face by each of two cameras 110, 115 of the stereo camera sensor 105. In the example of a structured light sensor 155, generation of the depth map may comprise searching and/or mapping disparities between an image of a pattern projected on a target face and a reference pattern.

Continuing with the structured light example, in FIG. 3 a reference pattern 305 is provided. The reference pattern may correspond to an array or grid of dots and/or lines.

Also depicted in FIG. 3 is the captured image 310, which comprises an image of the reference pattern as projected onto a target face, e.g. onto a 3D face. It can be seen that the captured image 310 is different from the reference pattern 305.

The depth map reconstruction algorithm may be configured to search for disparities between the captured image 310 and the reference pattern 305 and, based on such disparities, determine a depth map corresponding to the target face. In some embodiments, such disparities may be a difference in image location of the same 3D point when projected under perspective to two different cameras. In some embodiments, such disparities may be distances measured in pixels. In embodiments of the disclosure, the processor 125, 175 may be configured to optimise the face recognition algorithm by using the distance data from the time-of-flight sensors 120, 170 to reduce a disparity search range 315 of the depth map reconstruction algorithm. Advantageously, this may reduce an overall amount of data to be processed, thereby potentially reducing a total power consumption and/or execution time of the depth map reconstruction algorithm.

For example, if the distance data from the time-of-flight sensor 120, 170 indicates that the target face is a relatively short distance from the structured light sensor 155 or stereo camera sensor 105, then the disparity search range 315 may be relatively large. The disparity search range corresponds to a distance between points on the reference image and the captured image that is searched to identify disparities. However, if the distance data indicates that the target face is a relatively long distance from the structured light sensor 155 or stereo camera sensor 105, then the disparity search range 315 may be configured by the processor 125, 175 to be relatively small. Reducing the disparity search range 315 reduces an amount of data that is processed by the processor 125, 175.

Figure 4:
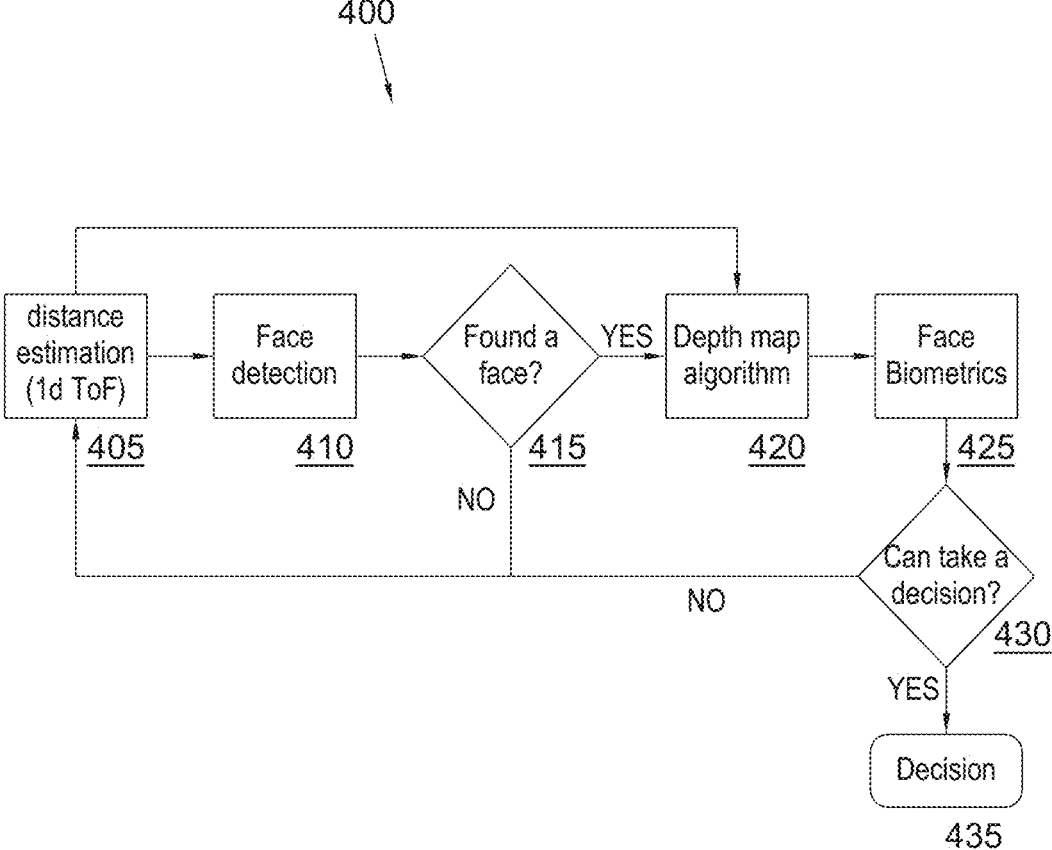
FIG. 4 depicts a flow diagram corresponding to operation of a 3D face recognition system according to an embodiment of the disclosure.

FIG. 4 depicts a flow diagram 400 corresponding to operation of a 3D face recognition system 100, 150 according to an embodiment of the disclosure.

In a step 405, the time-of-flight sensor 120, 170 is configured to determine a distance to a target face. The time-of-flight sensor 120, 170 provides distance data corresponding to a distance to a target, e.g. a distance to a one-dimensional point on a target.

A subsequent step 410 corresponds to a face detection process. The face detection process comprise capturing a stereo image of the target face using the stereo camera sensor 105 or an image captured by the structured light sensor 155. The face detection process also comprises executing a face detection algorithm for applying face detection to the captured image on a plurality of scales. Execution of the face detection algorithm is optimised by using the distance data to reduce a number of scales to be explored by the face detection algorithm, as described above with reference to FIG. 2.

At a subsequent decision point at step 415, an output of the face detection algorithm might be an indication that either no face is detected or that one or more faces are detected in areas of the image. If no face is detected, then the algorithm may revert to step 405, wherein the time-of-flight sensor 120, 170 is again configured to determine a distance to a target face and provide distance data corresponding to a distance to a target, e.g. a distance to a one-dimensional point on a target.

If it is determined that one or more faces is detected at step 415, then at a subsequent step 420, a depth map reconstruction algorithm for generating a depth map based on the data from the structured light sensor 155 or stereo camera sensor 105 is executed. The depth map reconstruction algorithm is optimised by using the distance data from the time-of-flight sensors 120, 170 to reduce a disparity search range of the depth map reconstruction algorithm, as described above with reference to FIG. 3.

At a subsequent step 425 a face biometrics algorithm for extracting biometric features from an output of the depth map reconstruction algorithm is executed. In some embodiments, the face biometrics algorithm may extract biometric features such as: features of the face, dimensions of the face, relative distance between features of the face, shapes and/or orientations of one or more feature of the face. The face biometrics algorithm may compare the biometric features with at least one model of a face, e.g. a reference model on a database.

At a subsequent step 430, it is determined whether a decision can be taken on whether a face is recognised based on the comparison of the biometric features with the at least one model of a face. If a decision can be taken, then at a subsequent step 435 a decision on whether a face is recognised or not is taken.

In some embodiments, if at step 430 a decision cannot be taken on whether a face is recognised based on the comparison of the biometric features with the at least one model of a face, then the flow reverts to step 405 and the process comprising steps 405, 410, 415, 420, 425 and 430 is repeated.

Figure 5:
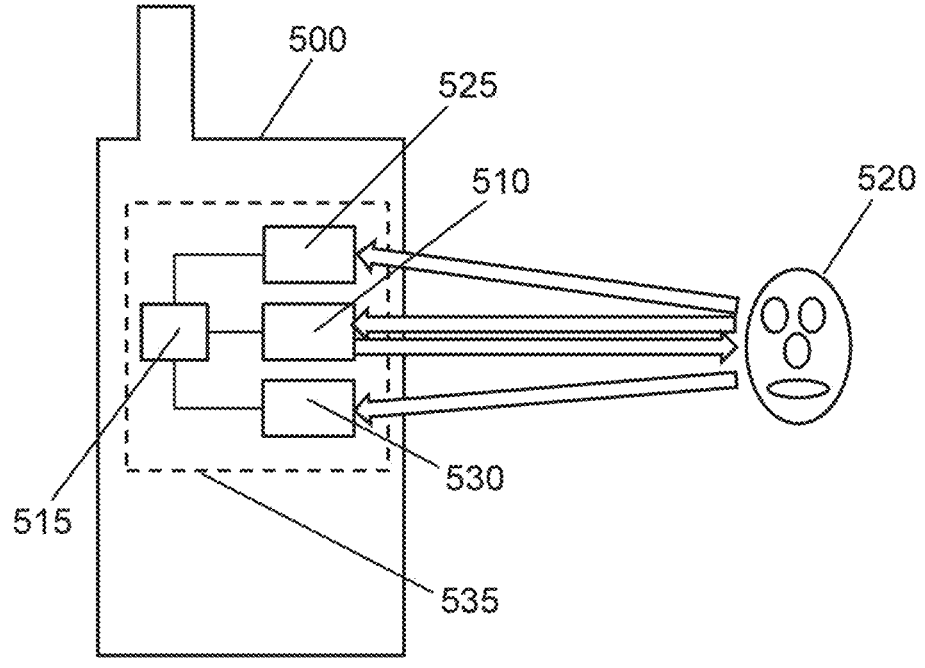
FIG. 5 depicts a device comprising a 3D face recognition system according to an embodiment of the disclosure.

FIG. 5 depicts a device 500 comprising a 3D face recognition system 505 according to an embodiment of the disclosure. For purposes of example only, the device 500 is a smartphone. It will be appreciated that the disclosed 3D face recognition system 505 may be implemented in other devices, such as an e-lock, a tablet device, a personal computer, a laptop, a wearable device, a camera or a video recording device. The 3D face recognition system 505 comprises a 1D time-of-flight sensor 510 configured to provide distance data to a processor 515. The distance data corresponds to a distance from the 1D time-of-flight sensor 510 to a target face 520. The 3D face recognition system 505 also comprises a stereo camera sensor 535 comprising a first camera 525 and a second camera 530. The first camera 525 and the second camera 530 are configured to provide data corresponding to images of the target face 520. The processor 515 is configured to execute a computer program product comprising instructions that cause the processor 515 to carry out the steps the flow diagram 400 as described above.

Figure 6:
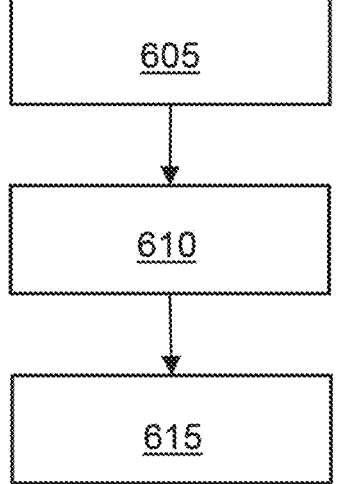
FIG. 6 depicts a flow diagram of a method of 3D face recognition, according to an embodiment of the disclosure.

FIG. 6 depicts a flow diagram of a method of 3D face recognition, according to an embodiment of the disclosure. In a first step 605 a 1D time-of-flight sensor is configured to provide data corresponding to a distance to the target face. In a second step 610 a structured light sensor or stereo camera sensor is configured to provide data corresponding to a depth map of a target face. In a third step 615, algorithms for face recognition are run on the data from the structured light sensor or stereo camera sensor, using the data from the time-of-flight sensor to optimise the algorithms.

Optimising the algorithms may comprise: using the distance data to reduce a number of scales to be explored by the face detection algorithm of the algorithms for face recognition; and/or using the distance data to reduce a disparity search range of the depth map reconstruction algorithm of the algorithms for face recognition.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

| REFERENCE NUMERALS | |
| --- | --- |
| 100 | 3D face recognition system |
| 105 | stereo camera sensor |
| 110 | first camera |
| 115 | second camera |
| 120 | time-of-flight sensor |
| 125 | processor |
| 130 | radiation |
| 135 | radiation |
| 140 | radiation |
| 145 | radiation |
| 150 | 3D face recognition system |
| 155 | structured light sensor |
| 160 | projector |
| 165 | image-capturing device |
| 170 | time-of-flight sensor |
| 175 | processor |
| 180 | radiation |
| 185 | radiation |
| 190 | radiation |
| 195 | radiation |
| 205 | image |
| 210 | image pyramid |
| 215a-e | images |
| 305 | reference pattern |
| 310 | captured image |
| 315 | disparity search range |
| 400 | flow diagram |
| 405 | step |
| 410 | step |
| 415 | step |
| 420 | step |
| 425 | step |
| 430 | step |
| 435 | step |
| 500 | device |
| 505 | 3D face recognition system |
| 510 | 1D time-of-flight sensor |
| 515 | processor |

-continued

| REFERENCE NUMERALS | |
| --- | --- |
| 520 | target face |
| 525 | first camera |
| 530 | second camera |
| 535 | stereo camera sensor |
| 605 | first step |
| 610 | second step |
| 615 | third step |

The invention claimed is:

1. A three-dimensional (3D) face recognition system comprising:
a structured light sensor or stereo camera sensor configured to provide image data comprising a captured image of a target face;
a time-of-flight sensor; and
a processor configured to run algorithms for face recognition on the image data from the structured light sensor or stereo camera sensor, wherein the processor is configured to use distance data from the time-of-flight sensor to optimize the algorithms for face recognition,
wherein the algorithms for face recognition comprise a face detection algorithm for applying face detection on a plurality of scales,
wherein the processor is configured to optimize the algorithms for face recognition by using the distance data to reduce a number of the plurality of scales to be explored by the face detection algorithm, which comprises a comparison of the captured image to a subset of reference images of a set of reference images, the set of reference images comprises a same image at a different scale corresponding to each scale of the plurality of scales, the subset of reference images determined based on the distance data.

2. The 3D face recognition system of claim 1, the distance data corresponds to one or more scales of the plurality of scales and the subset of reference images includes the same image at the one or more scales.

3. The 3D face recognition system of claim 1, wherein the time-of-flight sensor is configured to provide the distance data corresponding to a distance to the target face, and the structured light sensor or stereo camera sensor is configured to provide the image data corresponding to a depth map of the target face.

4. The 3D face recognition system of claim 1, wherein the time-of-flight sensor is a one-dimensional (1D) time-of-flight sensor.

5. The 3D face recognition system of claim 1, wherein the structured light sensor or stereo camera sensor is configured to provide the image data corresponding to a plurality of frames, and the time-of-flight sensor is configured to provide the distance data corresponding to each frame.

6. A device comprising a 3D face recognition system according to claim 1, wherein the device is one of: an electronic lock (eLock); a smartphone; a tablet device; a personal computer; a laptop; a wearable device; a cellular telephone; a camera; a video recording device; a robotic device; a measuring device; a gaming device; or an automotive device.

7. The 3D face recognition system of claim 1, wherein reducing the number of the plurality of scales to be explored by the face detection algorithm comprises reducing the number of reference images in the set of reference images to be compared.

8. The 3D face recognition system of claim 1, wherein the set of reference images comprises a low-pass or band-pass image pyramid.

9. The 3D face recognition system of claim 1, wherein the set of reference images comprises a Gaussian, Laplacian or Steerable pyramid.

10. The 3D face recognition system of claim 1, wherein the algorithms for face recognition comprise a depth map reconstruction algorithm, wherein the processor is configured to optimize the face recognition algorithm by using the distance data to reduce a disparity search range of the depth map reconstruction algorithm, wherein the depth map reconstruction is based on identified disparities between two images; and wherein the image data comprises a captured patterned image from the structured light sensor, which comprises an image of a reference pattern as projected onto a target face, and wherein the disparity search range corresponds to a range of distances between points on the reference pattern and the captured patterned image that are searched to identify disparities, or wherein the image data comprises a captured image of the target face from each camera of the stereo camera sensor, and wherein the disparity search range corresponds to a range of distances between image locations of a same 3D point on each of the captured images that are searched to identify disparities.

11. A three-dimensional (3D) face recognition system comprising:

a structured light sensor or stereo camera sensor;

a time-of-flight sensor; and a processor configured to run algorithms for face recognition on image data corresponding to a target face from the structured light sensor or stereo camera sensor, wherein the processor is configured to use distance data from the time-of-flight sensor to optimize the algorithms for face recognition, wherein the algorithms for face recognition comprise a depth map reconstruction algorithm;

wherein the processor is configured to optimize the face recognition algorithm by using the distance data to reduce a disparity search range of the depth map reconstruction algorithm, wherein the depth map reconstruction algorithm is based on identified disparities between two images.

12. The 3D face recognition system of claim 11, wherein the algorithms for face recognition comprise a face biometrics algorithm for extracting biometric features from an output of the depth map reconstruction algorithm and for comparing the biometric features with at least one model of a face.

13. The 3D face recognition system of claim 12, wherein the processor is configured to make a decision on whether a face is recognized based on the comparison of the biometric features with the at least one model of a face.

14. The 3D face recognition system of claim 11, wherein the image data comprises a captured patterned image from the structured light sensor, which comprises an image of a reference pattern as projected onto a target face, and wherein the disparity search range corresponds to a range of distances between points on the reference pattern and the captured patterned image that are searched to identify disparities.

15. The 3D face recognition system of claim 11, wherein the image data comprises a captured image of the target face from each camera of the stereo camera sensor, and wherein the disparity search range corresponds to a range of distances between image locations of a same 3D point on each of the captured images that are searched to identify disparities.

16. The 3D face recognition system of claim 11, wherein the processor is configured to set a large disparity search range when the distance data indicates the target face is a short distance away, and set a small disparity search range when the distance data indicates the target face is a long distance away.

17. The 3D face recognition system of claim 11, wherein the reference pattern corresponds to an array or grid of dots and/or lines.

18. The 3D face recognition system of claim 11, wherein the disparities comprise distances measured in pixels.

19. A method of three-dimensional (3D) face recognition comprising the steps of:

configuring a time-of-flight sensor to provide distance data corresponding to a distance to a target face;

configuring a structured light sensor or stereo camera sensor to provide image data corresponding to a depth map of the target face and a captured image of the target face; and running algorithms for face recognition on the image data from the structured light sensor or stereo camera sensor, using the distance data from the time-of-flight sensor to optimize the algorithms, wherein:

the algorithms for face recognition comprise a face detection algorithm for applying face detection on a plurality of scales, and optimizing the algorithms comprises using the distance data to reduce a number of the plurality of scales to be explored by the face detection algorithm, which comprises a comparison of the captured image to a subset of reference images of a set of reference images, the set of reference images comprises a same image at a different scale corresponding to each scale of the plurality of scales, the subset of reference images determined based on the distance data;

and/or the algorithms for face recognition comprise a depth map reconstruction algorithm, and optimizing the algorithms comprises using the distance data to reduce a disparity search range of the depth map reconstruction algorithm, wherein the depth map reconstruction algorithm is based on identified disparities between two images, and wherein the image data comprises a captured patterned image from the structured light sensor, which comprises an image of a reference pattern as projected onto a target face, and wherein the disparity search range corresponds to a range of distances between points on the reference pattern and the captured patterned image that are searched to identify disparities;

or wherein the image data comprises a captured image of the target face from each camera of the stereo camera sensor, and wherein the disparity search range corresponds to a range of distances between image locations of a same 3D point on each of the captured images that are searched to identify disparities.

20. A non-transitory computer-readable medium configured to store a three-dimensional (3D) face recognition program including instructions that, when executed by a processor, causes the processor to perform the method of claim 19.

* * * * *